United States Patent
Hao et al.

(10) Patent No.: US 9,398,616 B2
(45) Date of Patent: Jul. 19, 2016

(54) METHOD FOR SEQUENCING THE ZC SEQUENCES OF THE RACH

(71) Applicant: ZTE Corporation, Shenzhen, Guangdong (CN)

(72) Inventors: Peng Hao, Guangdong (CN); Shuqiang Xia, Guangdong (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 103 days.

(21) Appl. No.: 14/164,228

(22) Filed: Jan. 26, 2014

(65) Prior Publication Data

US 2014/0140301 A1    May 22, 2014

Related U.S. Application Data (62) Division of application No. 12/746,078, filed as application No. PCT/CN2008/071830 on Jul. 31, 2008, now Pat. No. 8,654,624.

(30) Foreign Application Priority Data

Dec. 5, 2007    (CN) .......................... 2007 1 0194922

(51) Int. Cl.
*H04J 11/00*    (2006.01)
*H04W 74/08*    (2009.01)
*H04J 13/00*    (2011.01)
*H04J 13/16*    (2011.01)

(52) U.S. Cl.
CPC ....... *H04W 74/0833* (2013.01); *H04J 13/0062* (2013.01); *H04J 13/16* (2013.01)

(58) Field of Classification Search
CPC .. H04W 74/0833; H04J 13/0062; H04J 13/16
See application file for complete search history.

(56) References Cited

U.S. PATENT DOCUMENTS

| | | | |
|---|---|---|---|
| 2008/0235314 A1* | 9/2008 | Lee et al. | 708/426 |
| 2009/0046629 A1* | 2/2009 | Jiang et al. | 370/328 |
| 2009/0073944 A1* | 3/2009 | Jiang et al. | 370/338 |
| 2010/0210243 A1* | 8/2010 | Vujcic | 455/411 |

* cited by examiner

*Primary Examiner* — Luat Phung
(74) *Attorney, Agent, or Firm* — Bright IP Law Offices (57) ABSTRACT

A method for sequencing the ZC sequences of the RACH is provided, wherein, the method for sequencing the ZC sequences comprises: setting the logical index of each ZC sequence as α, and the physical index of each ZC sequence as u, wherein $1 \leq u \leq N-1, 0 \leq \alpha \leq N-2$, N is the length of each ZC sequence and N=839; creating the physical indices u corresponding to the logical indices α=0, 1, . . . , 837, sequencing the ZC sequences of the RACH according to the created mapping relationship between the logical indices and the physical indices.

1 Claim, 6 Drawing Sheets

METHOD FOR SEQUENCING THE ZC SEQUENCES OF THE RACH

FIELD OF THE INVENTION

The present invention relates to communication field, in particular to a method for sequencing the ZC sequences of the random access channel.

BACKGROUND OF THE INVENTION

In the Long Term Evolution (LTE for short) system, cyclic shift sequences of Zadoff-Chu (ZC for short) sequences are used as the preamble by the Random Access Channel (RACH for short). These cyclic shift sequences are also referred to as Zero Correlation Zone (ZCZ for short) sequences.

In practical systems, after a mobile phone is powered on, downlink synchronization is first performed, and then the detection of the Broadcast Channel (BCH for short) is initiated. A base station informs, via the BCH channel, the mobile phone of the index and the step length of the cyclic shift of the first ZC sequence available for the RACH of the current cell. According to the index, the mobile phone makes use of certain mapping rule to calculate the serial number of the corresponding ZC sequence, and then, generates usable ZCZ sequences according to the step length of the cyclic shift and a certain "cyclic shift limitation rule" (the mobile phone is under a high speed circumstance).

If the number of the ZCZ sequences is smaller than a certain threshold Q, the mobile phone automatically increments the sequence index, and continuously generates the ZCZ sequences using the next ZC sequence, until the total number of the ZCZ sequences is larger than or equal to Q. Finally, the mobile phone randomly selects one sequence from all the generated usable ZCZ sequences as a preamble to be sent.

In the high speed circumstance, the frequency offset caused by Doppler Effect will generate, during the process of the preamble detection, a correlation peak alias, which will lead to a timing offset and a false detection. This problem is settled in the LTE system through limiting the use of some cyclic shifts according to a certain rule, which is the above mentioned "cyclic shift limitation rule".

Meanwhile, the cyclic shift limitation rule also limits the maximum cyclic shift $N_{CS}$ corresponding to each ZC sequence, and this maximum cyclic shift directly determines the maximum cell radius supported by each ZC sequence. Assuming that the distance between the correlation peak and the correlation peak alias thereof is du, the relation between the maximum cyclic shift $N_{CS}$ and du is:

$$N_{CS} = \min(du, N_{ZC} - 2 \cdot du) \quad (1)$$

Wherein, $N_{ZC}$ is the length of a ZC sequence, du can be calculated by the following formula:

$$du = \begin{cases} \dfrac{m \cdot N_{ZC} - 1}{u}, & \text{when } \dfrac{m \cdot N_{ZC} - 1}{u} \leq \text{floor}(N/2) \\ N_{ZC} - \dfrac{m \cdot N_{ZC} - 1}{u}, & \text{when } \dfrac{m \cdot N_{ZC} - 1}{u} > \text{floor}(N/2) \end{cases} \quad (2)$$

Wherein, u is the serial number of the ZC sequence, and m is the minimum positive integer which makes $$\frac{m \cdot N_{ZC} - 1}{u}$$

a positive integer.

The mapping process between the indices and the serial numbers of the ZC sequences is actually the process of re-sequencing the ZC sequences. Wherein, the generation formula of the ZC sequences is shown as Equation (3) ($0 \leq u \leq NZC-1$), and the serial number of the ZC sequence is the serial number used in the generation of each ZC sequence. The index of the sequence is the sequence number of each ZC sequence in a queue of sequenced ZC sequences, where the ZC sequences are sequenced according to a certain criterion.

$$x_u(n) = e^{-j\frac{\pi u n(n+1)}{N_{ZC}}}, \quad 0 \leq n \leq N_{ZC} - 1 \quad (3)$$

At present, there are mainly two sequencing methods: one is to sequence according to the cubic metric (CM for short, it is a standard for measuring the Peak-to-Average Power Ratio of the emitted data, the larger the CM is, the higher the Peak-to-Average Power Ratio is) of the ZC sequences, and the other is to sequence according to the maximum cell radius supported by each ZC sequence under a high speed circumstance.

Figure 1:
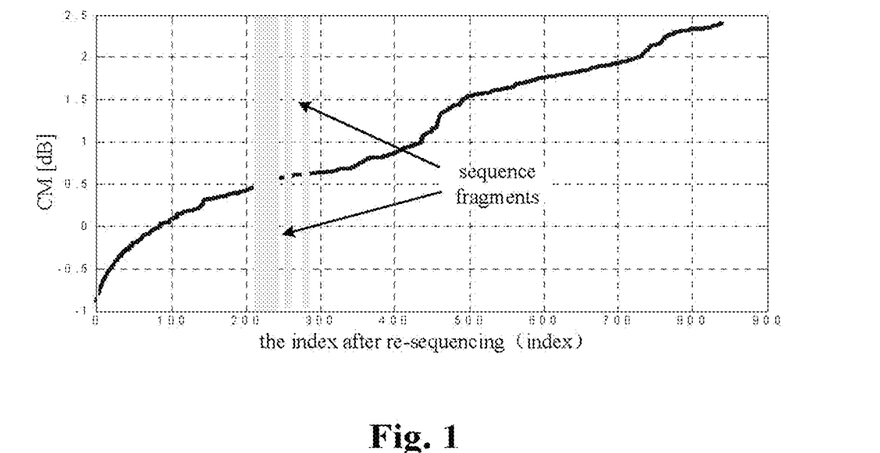
FIG. 1 is a schematic diagram of the generation of the sequence fragments in the prior art.

The first method is advantageous in that network planning of the ZC sequences can be conveniently performed according to the CM of a root sequence so as to assign the sequences with smaller CMs to the cells with larger radius, and the sequences with similar CMs to the same cell. Its shortcoming lies in that sequence fragments will be generated under the high speed circumstance, which will cause the waste of the sequences. In other words, during the process of generating the ZCZ sequences with the continuous incrementation of the sequence index, if the maximum cell radius supported by a ZC sequence is smaller than the radius of the current cell, this sequence neither could be used by the current cell, nor it could be used by other cells having radiuses smaller than the maximum cell radius supported by this ZC sequence (this is because that the index is continuously incremental, as shown in FIG. 1).

The second method is advantageous in avoiding the generation of the sequence fragments, that is disadvantageous in that the CMs of the ZC sequences assigned to a cell differs greatly from each other so that sequence planning can not be performed according to the CM.

A patent application of the present applicant with an application number of 200710135732.1 provides a method and device for sequencing the ZC sequences of the random access channel, which can not only prevent sequence fragments from being generated in the high speed circumstance, but also perform sequence planning and assigning according to the CM character of the sequences. The method comprises the following steps:

step 1, the sequences are sequenced according to the CM values of the sequences;

step 2, the sequencing result of step 1 is grouped according to a particular CM value (for example, the grouping may be performed according to the CM value of QPSK (about 1.2 dB));

step 3, the sequences in each group are sequenced, according to the maximum cell radius supported by the sequences under the high speed circumstance, for a second time to obtain the final sequencing result.

The present invention modifies the sequencing method and device provided by the patent application with the application number of 200710135732.1. The present invention not only inherits all the advantages of the application, but also performs a better sequence planning and assigning according to the CM character of the sequence, so that sequences with similar CMs are assigned to the same cell.

SUMMARY OF THE INVENTION

In view of the above mentioned one or more problems, the present invention provides a method for sequencing the ZC sequences of the random access channel.

The present invention provides a method for sequencing the ZC sequences of the random access channel. The method for sequencing the ZC sequences of the random access channel according to the present invention comprises: step 1, according to Cubic Metric, CM, of Quadrature Phase Shift Keying, OPSK, ZC sequences of the RACH are divided into a low CM group and a high CM group, to make the index of each ZC sequence within the low CM group smaller or larger than the index of each ZC sequence within the high CM group; step 2, according to the maximum cell radius or maximum cyclic shift supported by the ZC sequences under high speed circumstance, the ZC sequences within the low CM group and within the high CM group are respectively divided into S sub-groups using S−1 maximum cyclic shift thresholds, wherein S is a positive integer; and step 3, according to the CMs of the ZC sequences, the sequences are sequenced within each sub-group, to make the ZC sequences in adjacent sub-groups within the low CM group and within the high CM group have different sequencing and the ZC sequences in adjacent sub-groups between the low CM group and the high CM group have the same sequencing, wherein the last sub-group within the low CM group and the first sub-group within the high CM group are adjacent with each other while the first sub-group within the low CM group and the last sub-group within the high CM group are adjacent with each other.

The CMs of the ZC sequences within the low CM group is not larger than the CM of QPSK; and the CMs of the ZC sequences within the low CM group is larger than the CM of QPSK.

In step 3, the sequences are sequenced from high to low or from low to high.

The index of the sequence within sub-group i is set smaller than the index of the sequences within sub-group i+1, wherein $1 \leq i \leq S-1$, the $i^{th}$ maximum cyclic shift threshold is Th_Ncs(i), and Th_Ncs(i)<Th_Ncs(i+1), wherein, $1 \leq i \leq S-2$ and i is a positive integer; as for the low CM group, when $1<i<S$, the maximum value of the maximum cyclic shift supported by each ZC sequence within sub-group i is not less than Th_Ncs(i−1) and less than Th_Ncs(i); when i=1, the maximum value of the maximum cyclic shift supported by each ZC sequence within sub-group i is less than Th_Ncs(1); when i=S, the maximum value of the maximum cyclic shift supported by each ZC sequence within sub-group is not less than Th_Ncs(S−1); or when $1<i<S$, the maximum value of the maximum cyclic shift supported by each ZC sequence within sub-group i is larger than Th_Ncs(i−1) and not larger than Th_Ncs(i); when i=1, the maximum value of the maximum cyclic shift supported by each ZC sequence within sub-group i is not larger than Th_Ncs(1); when i=S, the maximum value of the maximum cyclic shift supported by each ZC sequence within sub-group i is larger than Th_Ncs(S−1); and as for the high CM group, when $1<i<S$, the maximum value of the maximum cyclic shift supported by each ZC sequence within sub-group i is not less than Th_Ncs(S−i) and less than Th_Ncs(S−i+1); when i=11, the maximum value of the maximum cyclic shift supported by each ZC sequence within sub-group i is not less than Th_Ncs(S−1); when i=S, the maximum value of the maximum cyclic shift supported by each ZC sequence within sub-group i is less than Th_Ncs(1); or when $1<i<S$, the maximum value of the maximum cyclic shift supported by each ZC sequence within sub-group i is larger than Th_Ncs(S−i) and not larger than Th_Ncs(S−i+1); when i=1, the maximum value of the maximum cyclic shift supported by each ZC sequence within sub-group i is larger than Th_Ncs(S−1); when i=S, the maximum value of the maximum cyclic shift supported by each ZC sequence within sub-group i is not larger than Th_Ncs(1).

The index of the sequence within sub-group i is set smaller than the index of the sequence within sub-group i+1, wherein $1 \leq i \leq S-1$, the $i^{th}$ maximum cyclic shift threshold is Th_Ncs(i), and Th_Ncs(i)<Th_Ncs(i+1), wherein, $1 \leq i \leq S-2$ and i is a positive integer; as for the low CM group, when $1<i<S$, the maximum value of the maximum cyclic shift supported by each ZC sequence within sub-group i is not less than Th_Ncs(i−1) and less than Th_Ncs(S−i+1); when i=1, the maximum value of the maximum cyclic shift supported by each ZC sequence within sub-group i is not less than Th_Ncs(S−i); when i=S, the maximum value of the maximum cyclic shift supported by each ZC sequence within sub-group i is less than Th_Ncs(1); or when $1<i<S$, the maximum value of the maximum cyclic shift supported by each ZC sequence within sub-group i is larger than Th_Ncs(S−i) and not larger than Th_Ncs(S−i+1); when i=1, the maximum value of the maximum cyclic shift supported by each ZC sequence within sub-group i is larger than Th_Ncs(S−1); when i=S, the maximum value of the maximum cyclic shift supported by each ZC sequence within sub-group i is not larger than Th_Ncs(1); and as for the high CM group, when $1<i<S$, the maximum value of the maximum cyclic shift supported by each ZC sequence within sub-group i is not less than Th_Ncs(i−1) and less than Th_Ncs(i); when i=1, the maximum value of the maximum cyclic shift supported by each ZC sequence within sub-group i is less than Th_Ncs(1); when i=S, the maximum value of the maximum cyclic shift supported by each ZC sequence within sub-group i is not less than Th_Ncs(S−1); or when $1<i<S$, the maximum value of the maximum cyclic shift supported by each ZC sequence within sub-group i is larger than Th_Ncs(i−1) and not larger than Th_Ncs(i); when i=11, the maximum value of the maximum cyclic shift supported by each ZC sequence within sub-group i is not larger than Th_Ncs(1); when i=S, the maximum value of the maximum cyclic shift supported by each ZC sequence within sub-group i is larger than Th_Ncs(S−1).

The maximum cyclic shift is $N_{CS}=\min(du, N_{ZC}-2 \cdot du)$, wherein, du is the distance between the correlation peak alia and correlation peek, $N_{ZC}$ is the length of the ZC sequence.

The distance between the correlation peak alias and correlation peak $$is, \ du = \begin{cases} \frac{m \cdot N_{ZC} - 1}{u}, & when \ \frac{m \cdot N_{ZC} - 1}{u} \leq floor(N_{ZC}/2) \\ N_{ZC} - \frac{m \cdot N_{ZC} - 1}{u}, & when \ \frac{m \cdot N_{ZC} - 1}{u} > floor(N_{ZC}/2) \end{cases},$$

wherein u is the serial number of the ZC sequence, m is the minimum positive integer which makes $$\frac{m \cdot N_{ZC} - 1}{u}$$

a positive integer.

The present invention also provides a method for sequencing the ZC sequences of the RACH, the method for sequencing the ZC sequences of the RACH according to the present invention comprises: setting the logical index of each ZC sequence as α, and the physical index of each ZC sequence as u, wherein 1≤u≤N-1, 0≤α≤N-2, N is the length of each ZC sequence and N=839; creating the physical indices u corresponding to the logical indices α=0, 1, . . . , 837, the physical indices u are: 129, 710, 140, 699, 120, 719, 210, 629, 168, 671, 84, 755, 105, 734, 93, 746, 70, 769, 60, 779, 2, 837, 1, 838, 56, 783, 112, 727, 148, 691, 80, 759, 42, 797, 40, 799, 35, 804, 73, 766, 146, 693, 31, 808, 28, 811, 30, 809, 27, 812, 29, 810, 24, 815, 48, 791, 68, 771, 74, 765, 178, 661, 136, 703, 86, 753, 78, 761, 43, 796, 39, 800, 20, 819, 21, 818, 95, 744, 202, 637, 190, 649, 181, 658, 137, 702, 125, 714, 151, 688, 217, 622, 128, 711, 142, 697, 122, 717, 203, 636, 118, 721, 110, 729, 89, 750, 103, 736, 61, 778, 55, 784, 15, 824, 14, 825, 12, 827, 23, 816, 34, 805, 37, 802, 46, 793, 207, 632, 179, 660, 145, 694, 130, 709, 223, 616, 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830, 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621, 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833, 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689, 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835, 3, 836, 19, 820, 22, 817, 41, 798, 38, 801, 44, 795, 52, 787, 45, 794, 63, 776, 67, 772, 72, 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613, 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515, 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580, 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517, 330, 509, 338, 501, 341, 498, 340, 499, 342, 497, 301, 538, 366, 473, 401, 438, 371, 468, 408, 431, 375, 464, 249, 590, 269, 570, 238, 601, 234, 605, 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518, 346, 493, 339, 500, 351, 488, 306, 533, 289, 550, 400, 439, 378, 461, 374, 465, 415, 424, 270, 569, 241, 598, 231, 608, 260, 579, 268, 571, 276, 563, 409, 430, 398, 441, 290, 549, 304, 535, 308, 531, 358, 481, 316, 523, 293, 546, 288, 551, 284, 555, 368, 471, 253, 586, 256, 583, 263, 576, 242, 597, 274, 565, 402, 437, 383, 456, 357, 482, 329, 510, 317, 522, 307, 532, 286, 553, 287, 552, 266, 573, 261, 578, 236, 603, 303, 536, 356, 483, 355, 484, 405, 434, 404, 435, 406, 433, 235, 604, 267, 572, 302, 537, 367, 472, 296, 543, 336, 503, 305, 534, 373, 466, 280, 559, 279, 560, 419, 420, 240, 599, 258, 581, 229, 610; sequencing the ZC sequences of the RACH according to the created mapping relationship between the logical indices and the physical indices.

The present invention also provides a device for sequencing the ZC sequences of the RACH, the device for sequencing the ZC sequences of the RACH according to the present invention comprises, a first group dividing unit configured to divide ZC sequences of the RACH into a low CM group and a high CM group according to the CM of QPSK, to make the index of each ZC sequence within the low CM group smaller or larger than the index of each ZC sequence within the high CM group; a second group dividing unit configured to respectively divide the ZC sequences within the low CM group and within the high CM group into S sub-groups using S−1 maximum cyclic shift thresholds according to the maximum cell radius or maximum cyclic shift supported by the ZC sequences under high speed circumstance, wherein S is a positive integer; and a sequencing unit configured to sequence the sequences within each sub-group according to the CMs of the ZC sequences, to make the ZC sequences in adjacent sub-groups within the low CM group and within the high CM group have different sequencing, and the ZC sequences in adjacent sub-groups between the low CM group and the high CM group have the same sequencing, wherein the last sub-group within the low CM group and the first sub-group within the high CM group are adjacent with each other while the first sub-group within the low CM group and the last sub-group within the high CM group are adjacent with each other.

The method and device for sequencing the ZC sequences of the RACH provided by the present invention not only enables the assignment of the sequences according to the CMs, but also enables the collection of the sequence fragments for use, so that the generation of sequence fragments can be avoided.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF THE EMBODIMENTS

The embodiments of the present invention will be described hereinafter in detail in conjunction with the drawings thereof.

The present invention provides a method for sequencing the ZC sequences of the RACH.

Figure 2:
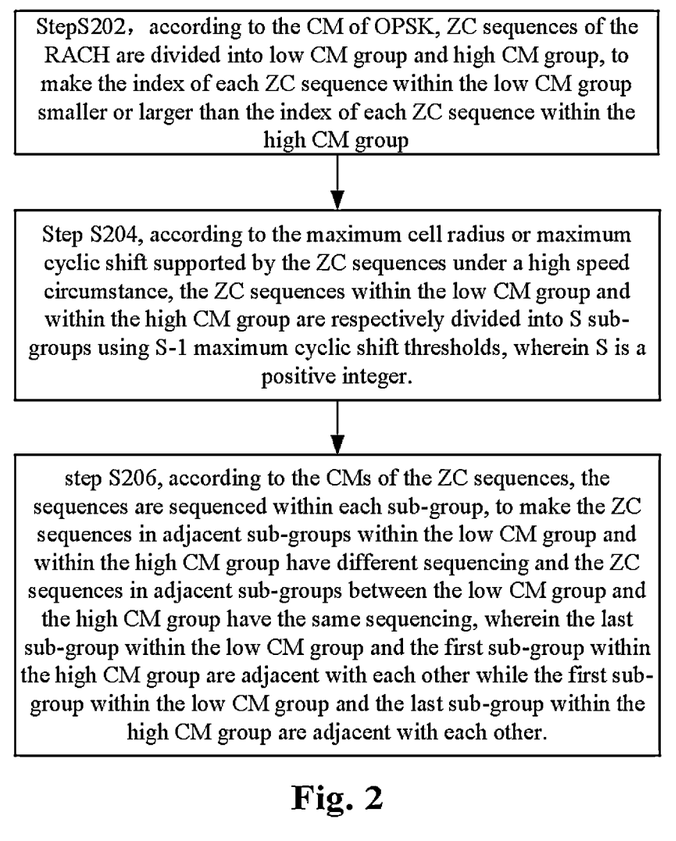
FIG. 2 is a flowchart of the method for sequencing the ZC sequences of the random access channel according to an embodiment of the present invention.

FIG. 2 shows the method for sequencing the ZC sequences of the RACH according to an embodiment of the present invention. As shown in FIG. 2, the method comprises:

step S202, according to the CM of OPSK, ZC sequences of the RACH are divided into low CM group and high CM group, to make the index of each ZC sequence within the low CM group smaller or larger than the index of each ZC sequence within the high CM group.

step S204, according to the maximum cell radius or maximum cyclic shift supported by the ZC sequences under a high speed circumstance, the ZC sequences within the low CM group and within the high CM group are respectively divided into S sub-groups using S−1 maximum cyclic shift thresholds, wherein S is a positive integer.

step S206, according to the CMs of the ZC sequences, the sequences are sequenced within each sub-group, to make the ZC sequences in adjacent sub-groups within the low CM group and within the high CM group have different sequencing and the ZC sequences in adjacent sub-groups between the low CM group and the high CM group have the same sequencing, wherein the last sub-group within the low CM group and the first sub-group within the high CM group are adjacent with each other while the first sub-group within the low CM group and the last sub-group within the high CM group are adjacent with each other.

In the FDD mode of the LTE, the length of the ZC sequences used by the RACH is 839, and the number of usable sequences is 838.

All the ZC sequences of the RACH are divided, using the CM of QPSK as a threshold, into two groups, i.e., the low CM group and the high CM group. The CMs of the ZC sequences in the low CM group are smaller than or equal to the CM of QPSK, while the CMs of the ZC sequences in the high CM group are larger than the CM of QPSK, which is 1.2 dB.

Figure 3:
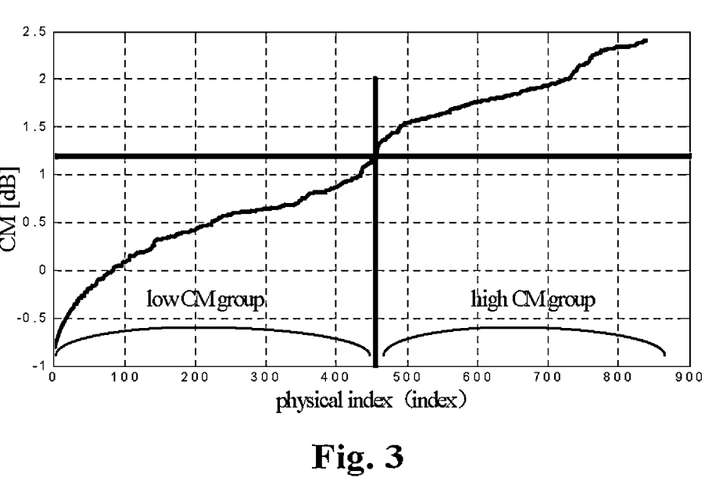
FIG. 3 is a schematic diagram showing the grouping of the ZC sequences of the RACH according to an embodiment of the present invention.

After the final sequencing process, the indices of the sequences in the low CM group are smaller than the indices of the sequences in the high CM group, as shown in FIG. 3, or the indices of the sequences in the low CM group are larger than the indices of the sequences in the high CM group.

According to the maximum cell radius or maximum cyclic shift supported by the ZC sequences under a high speed circumstance, the ZC sequences within each group are divided into S sub-groups using S−1 maximum cyclic shift thresholds, these sub-groups are numbered with 1 to S, wherein S is a positive integer.

After the final sequencing process is completed, the indices of the sequences in sub-group i are all smaller than the indices of the sequences in sub-group i+1, 1≤i≤S−1, the $i^{th}$ maximum cyclic shift threshold is Th_Ncs(i), and Th_Ncs(i)<Th_Ncs(i+1), wherein, 1≤i≤S−2 and i is a positive integer.

Setting S=16, then 15 maximum cyclic shift thresholds Th_Ncs(1), Th_Ncs(2), . . . , Th_Ncs(15) are 15, 18, 22, 26, 32, 38, 46, 55, 68, 82, 100, 128, 158, 202, 237, respectively.

Figure 4A:
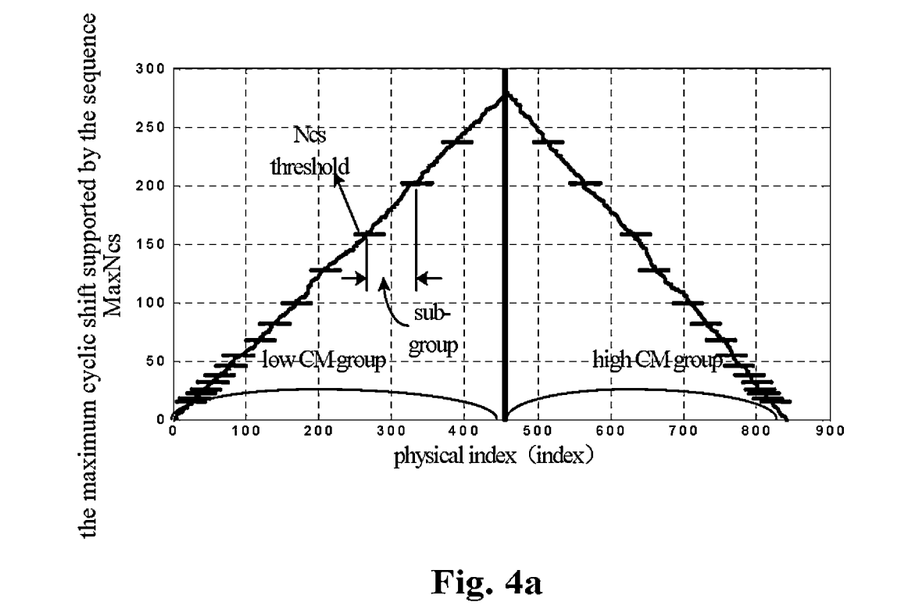
FIG. 4a-4d are schematic diagrams showing the grouping and sequencing of the ZC sequences of the RACH according to an embodiment of the present invention.
Figure 4B:
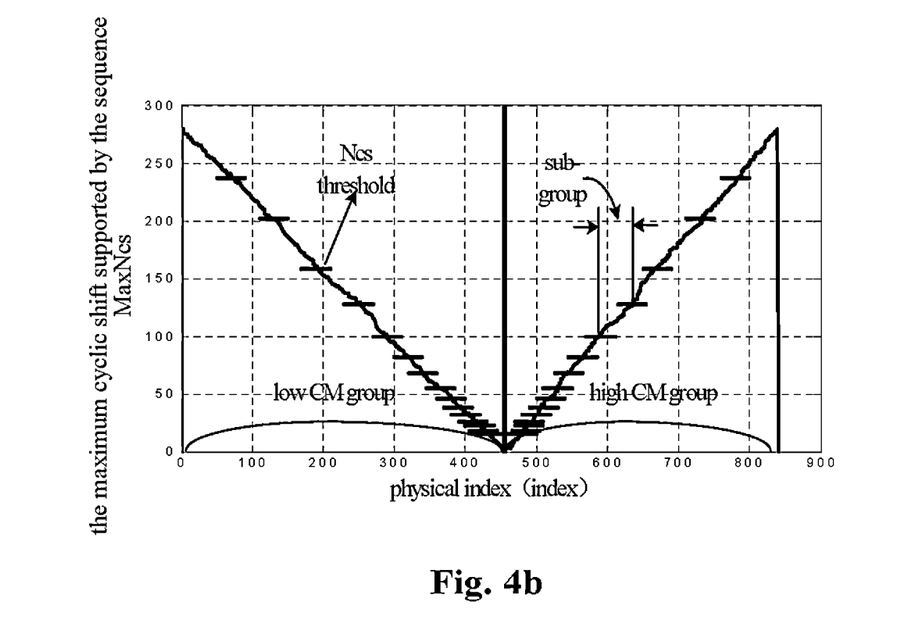

If the maximum value of the maximum cyclic shift supported by the ZC sequences in the $j^{th}$ sub-group under the high speed circumstance is made to be MaxNcs(i), 1≤i≤S, then each sub-group in each group shall satisfy the following property (Property a), as shown in FIG. 4a: for the low CM group, when 1<i<S, Th_Ncs(i−1)≤MaxNcs(i)<Th_Ncs(i), when i=1, MaxNcs(1)<Th_Ncs(1), when i=S, Th_Ncs(S−1) ≤MaxNcs(S); for the high CM group, when 1<i<S, Th_Ncs (S−i)≤MaxNcs(i)<Th_Ncs(S−i+1), when i=1, Th_Ncs(S−1) ≤MaxNcs(1), when i=S, MaxNcs(S)<Th_Ncs(1);

or the following property (Property b) shall be satisfied, as shown in FIG. 4b: for the low CM group, when 1<i<S, Th_Ncs(i−1)<MaxNcs(i)≤Th_Ncs(i), when i=1, MaxNcs(1) ≤Th_Ncs(1), when i=S, Th_Ncs(S−1)<MaxNcs(S); for the high CM group, when 1<i<S, Th_Ncs(S−i)<MaxNcs(i) ≤Th_Ncs(S−i+1), when i=1, Th_Ncs(S−1)<MaxNcs(1), when i=S, MaxNcs(S)≤Th_Ncs(1).

The following method can be used to realize the sequencing target in step S204.

step S2042, for the two groups of sequences obtained in step S202, i.e., the low CM group and the high CM group, the ZC sequences in each group are sequenced according to the maximum cell radius or the maximum cyclic shift supported by the ZC sequences under the high speed circumstance. The principles for the sequencing may be: the low CM group is sequenced in the increasing order, while the high CM group is sequenced in the decreasing order, the two groups use different sequencing principles.

step S2044, in each group, the sequencing result obtained in step S2042 is divided, according to S−1 maximum cyclic shift thresholds, into several segments, each of which is taken as a sub-group.

Figure 4C:
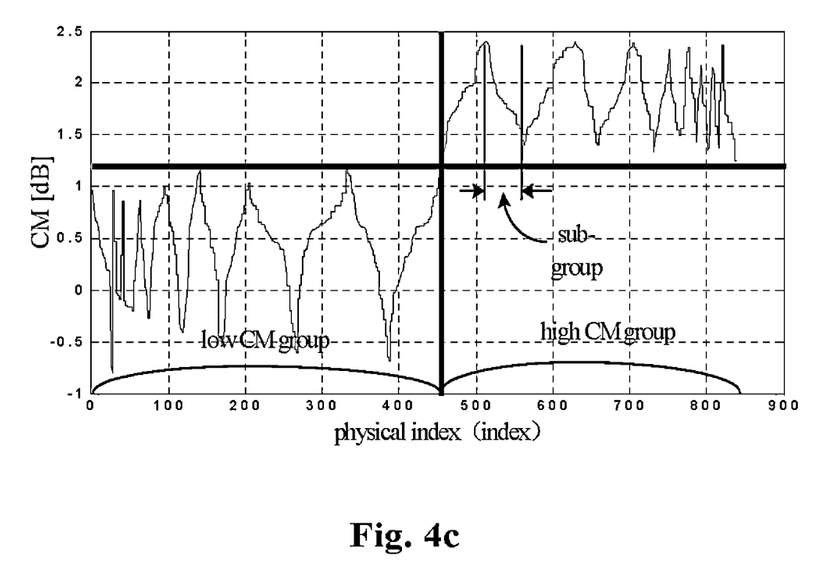
Figure 4D:
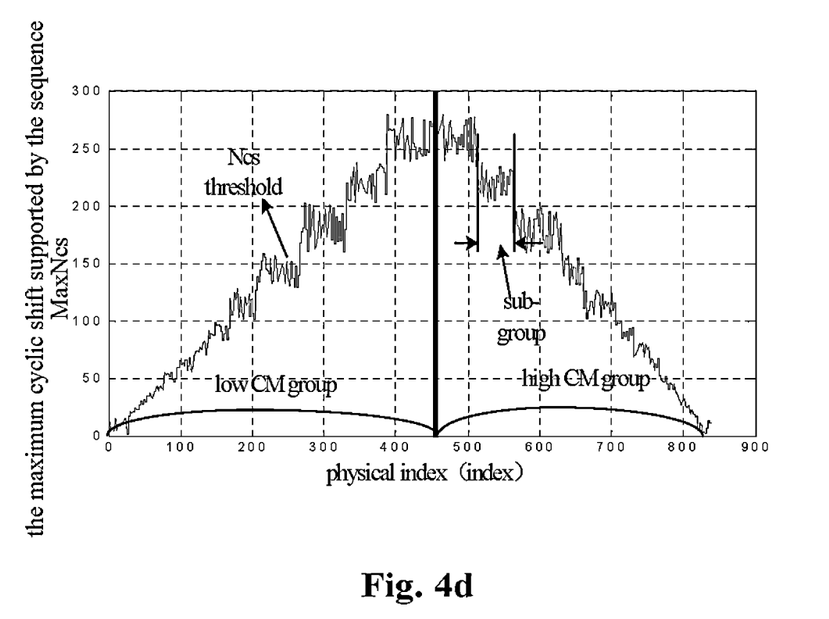

In each sub-group of each group, the sequencing is performed according to the CMs of the ZC sequences. In the low CM group, the sub-group with an odd sequence number is sequenced in the decreasing order, while the sub-group with an even sequence number is sequenced in the increasing order; in the high CM group, the sub-group with an odd sequence number is sequenced in the increasing order, while the sub-group with an even sequence number is sequenced in the decreasing order. Thus it is ensured that the sub-groups at the boundary of the two groups have the same sequencing order (the boundary of the groups shall be considered in a cyclic view). The sequencing results are shown in FIG. 4c and FIG. 4d, the indices are from 1 to N (N is the total number of the ZC sequences). In addition, the indices of the sequences are cyclic, that is, the index of the sequence which is next to the sequence with an index of N is 1.

The above mentioned maximum cyclic shift of the ZC sequence is $N_{CS}=\min(du, N_{ZC}-2 \cdot du)$, wherein, du is the distance between the correlation peak alias and the correlation peak, $N_{ZC}$ is the length of the ZC sequence, and the distance between the correlation peak alias and the correlation peak is $$du = \begin{cases} \dfrac{m \cdot N_{ZC} - 1}{u}, & \text{when } \dfrac{m \cdot N_{ZC} - 1}{u} \leq \text{floor}(N/2) \\ N_{ZC} - \dfrac{m \cdot N_{ZC} - 1}{u}, & \text{when } \dfrac{m \cdot N_{ZC} - 1}{u} > \text{floor}(N/2) \end{cases},$$

wherein u is the serial number of the ZC sequence, m is the minimum positive integer which makes $$\frac{m \cdot N_{ZC} - 1}{u}$$

a positive integer.

The most essential feature of the aforementioned sequencing result lie in that the sequences are divided into two groups according to the CM of QPSK; the sequences in each group are further divided into sub-groups according to the maximum cyclic shift thresholds; and the sequences in each sub-group are further sequenced according to the CM of the ZC sequences.

The sequencing results obtained from the above processes are shown in Table 1 to Table 4, wherein Table 1 and Table 2 show the elements of the low CM group and the high CM group, and Table 3 and Table 4 show the elements of each sub-group (SG) in the low CM group and the high CM group when Property a is satisfied.

TABLE 1

| Low CM group | | | | | | | | | | | | |
|---|---|---|---|---|---|---|---|---|---|---|---|---|
| 838 | 21 | 798 | 63 | 745 | 83 | 171 | 655 | 202 | 643 | 701 | 689 |
| 1 | 818 | 41 | 776 | 94 | 756 | 668 | 184 | 637 | 196 | 138 | 150 |
| 837 | 20 | 38 | 56 | 734 | 106 | 165 | 207 | 677 | 658 | 705 | 709 |
| 2 | 819 | 801 | 783 | 105 | 733 | 674 | 632 | 162 | 181 | 134 | 130 |
| 3 | 816 | 37 | 770 | 766 | 671 | 172 | 118 | 646 | 661 | 125 | 148 |
| 836 | 23 | 802 | 69 | 73 | 168 | 667 | 721 | 193 | 178 | 714 | 691 |
| 4 | 817 | 800 | 60 | 747 | 85 | 728 | 206 | 194 | 718 | 695 | 149 |
| 835 | 22 | 39 | 779 | 92 | 754 | 111 | 633 | 645 | 121 | 144 | 690 |
| 5 | 24 | 43 | 769 | 103 | 753 | 174 | 204 | 636 | 156 | 142 | 710 |
| 834 | 815 | 796 | 70 | 736 | 86 | 665 | 635 | 203 | 683 | 697 | 129 |
| 833 | 26 | 790 | 772 | 74 | 97 | 653 | 117 | 199 | 717 | 696 | 623 |
| 6 | 813 | 49 | 67 | 765 | 742 | 186 | 722 | 640 | 122 | 143 | 216 |
| 832 | 814 | 44 | 773 | 744 | 750 | 110 | 651 | 656 | 211 | 693 | 708 |
| 7 | 25 | 795 | 66 | 95 | 89 | 729 | 188 | 183 | 628 | 146 | 131 |
| 831 | 810 | 50 | 771 | 737 | 81 | 675 | 638 | 210 | 154 | 213 | 622 |
| 8 | 29 | 789 | 68 | 102 | 758 | 164 | 201 | 629 | 685 | 626 | 217 |
| 830 | 27 | 52 | 780 | 101 | 732 | 664 | 680 | 197 | 715 | 703 | 218 |
| 9 | 812 | 787 | 59 | 738 | 107 | 175 | 159 | 642 | 124 | 136 | 621 |
| 829 | 809 | 788 | 778 | 91 | 88 | 652 | 634 | 195 | 716 | 133 | 219 |
| 10 | 30 | 51 | 61 | 748 | 751 | 187 | 205 | 644 | 123 | 706 | 620 |
| 11 | 28 | 793 | 777 | 740 | 759 | 173 | 158 | 120 | 699 | 152 | 619 |
| 828 | 811 | 46 | 62 | 99 | 80 | 666 | 681 | 719 | 140 | 687 | 220 |
| 12 | 31 | 791 | 57 | 90 | 79 | 676 | 720 | 659 | 155 | 151 | 223 |
| 827 | 808 | 48 | 782 | 749 | 760 | 163 | 119 | 180 | 684 | 688 | 616 |
| 13 | 34 | 792 | 58 | 762 | 672 | 209 | 663 | 647 | 694 | 625 | 221 |
| 826 | 805 | 47 | 781 | 77 | 167 | 630 | 176 | 192 | 145 | 214 | 618 |
| 14 | 35 | 786 | 71 | 741 | 169 | 160 | 114 | 649 | 135 | 126 | 617 |
| 825 | 804 | 53 | 768 | 98 | 670 | 679 | 725 | 190 | 704 | 713 | 222 |
| 15 | 806 | 45 | 93 | 755 | 752 | 112 | 678 | 177 | 702 | 711 | 224 |
| 824 | 33 | 794 | 746 | 84 | 87 | 727 | 161 | 662 | 137 | 128 | 615 |
| 823 | 32 | 64 | 72 | 743 | 108 | 116 | 189 | 660 | 700 | 692 | 613 |
| 16 | 807 | 775 | 767 | 96 | 731 | 723 | 650 | 179 | 139 | 147 | 226 |
| 17 | 799 | 774 | 764 | 739 | 669 | 185 | 198 | 648 | 212 | 707 | 612 |
| 822 | 40 | 65 | 75 | 100 | 170 | 654 | 641 | 191 | 627 | 132 | 227 |
| 820 | 36 | 785 | 735 | 757 | 166 | 631 | 113 | 182 | 686 | 215 | 614 |
| 19 | 803 | 54 | 104 | 82 | 673 | 208 | 726 | 657 | 153 | 624 | 225 |
| 18 | 797 | 55 | 76 | 78 | 109 | 639 | 724 | 682 | 141 | 712 | 611 |
| 821 | 42 | 784 | 763 | 761 | 730 | 200 | 115 | 157 | 698 | 127 | 228 |

TABLE 2

| High CM group | | | | | | | | | | | | |
|---|---|---|---|---|---|---|---|---|---|---|---|---|
| 229 | 258 | 574 | 421 | 558 | 437 | 398 | 292 | 362 | 531 | 344 | 346 | 321 |
| 610 | 576 | 265 | 589 | 281 | 371 | 441 | 289 | 477 | 309 | 495 | 501 | 518 |
| 609 | 263 | 275 | 250 | 374 | 468 | 367 | 550 | 455 | 530 | 488 | 338 | 515 |
| 230 | 257 | 564 | 588 | 465 | 404 | 472 | 457 | 384 | 480 | 351 | 331 | 324 |
| 608 | 582 | 572 | 251 | 463 | 435 | 459 | 382 | 451 | 359 | 342 | 508 | 519 |
| 231 | 599 | 267 | 590 | 376 | 396 | 380 | 383 | 388 | 358 | 497 | 522 | 320 |
| 603 | 240 | 563 | 249 | 430 | 443 | 400 | 456 | 541 | 481 | 511 | 317 | 517 |
| 236 | 570 | 276 | 246 | 409 | 369 | 439 | 303 | 298 | 529 | 328 | 319 | 322 |
| 232 | 269 | 271 | 593 | 432 | 470 | 287 | 536 | 386 | 310 | 512 | 520 | 516 |
| 607 | 256 | 568 | 417 | 407 | 445 | 552 | 449 | 453 | 482 | 327 | 332 | 323 |
| 604 | 583 | 584 | 422 | 467 | 394 | 286 | 390 | 478 | 357 | 345 | 507 | |
| 235 | 268 | 255 | 416 | 372 | 368 | 553 | 365 | 361 | 527 | 494 | 337 | |
| 606 | 571 | 277 | 423 | 410 | 471 | 440 | 474 | 452 | 312 | 510 | 502 | |
| 233 | 241 | 562 | 559 | 429 | 378 | 399 | 535 | 387 | 355 | 329 | 506 | |
| 234 | 598 | 561 | 280 | 557 | 461 | 379 | 304 | 385 | 484 | 524 | 333 | |
| 605 | 575 | 278 | 248 | 282 | 397 | 460 | 363 | 454 | 528 | 315 | 491 | |

TABLE 2-continued

High CM group

| | | | | | | | | | | | |
|---|---|---|---|---|---|---|---|---|---|---|---|
| 237 | 264 | 420 | 591 | 377 | 442 | 458 | 476 | 294 | 311 | 350 | 348 |
| 602 | 270 | 419 | 424 | 462 | 393 | 381 | 300 | 545 | 485 | 489 | 349 |
| 601 | 569 | 266 | 415 | 436 | 446 | 551 | 539 | 360 | 354 | 340 | 490 |
| 238 | 567 | 573 | 247 | 403 | 405 | 288 | 293 | 479 | 356 | 499 | 514 |
| 577 | 272 | 586 | 592 | 375 | 434 | 548 | 546 | 542 | 483 | 341 | 325 |
| 262 | 242 | 253 | 373 | 464 | 555 | 291 | 538 | 297 | 313 | 498 | 492 |
| 261 | 597 | 279 | 466 | 406 | 284 | 448 | 301 | 295 | 526 | 318 | 347 |
| 578 | 274 | 560 | 426 | 433 | 370 | 391 | 305 | 544 | 525 | 521 | 330 |
| 600 | 565 | 254 | 413 | 444 | 469 | 549 | 534 | 296 | 314 | 316 | 509 |
| 239 | 244 | 585 | 414 | 395 | 438 | 290 | 299 | 543 | 353 | 523 | 505 |
| 260 | 595 | 587 | 425 | 431 | 401 | 302 | 540 | 533 | 486 | 339 | 334 |
| 579 | 566 | 252 | 412 | 408 | 447 | 537 | 389 | 306 | 487 | 500 | 336 |
| 259 | 273 | 245 | 427 | 283 | 392 | 473 | 450 | 532 | 352 | 326 | 503 |
| 580 | 243 | 594 | 428 | 556 | 285 | 366 | 475 | 307 | 343 | 513 | 504 |
| 581 | 596 | 418 | 411 | 402 | 554 | 547 | 364 | 308 | 496 | 493 | 335 |

TABLE 3

Low CM group (Property a)

| SG 1 | SG 2 | SG 3 | SG 4 | SG 5 | SG 6 | SG 7 | SG 8 | SG 9 | SG 10 | SG 11 | SG 12 | SG 13 | SG 14 | SG 15 | SG 16 |
|---|---|---|---|---|---|---|---|---|---|---|---|---|---|---|---|
| 129 | 56 | 80 | 35 | 808 | 24 | 86 | 744 | 217 | 12 | 228 | 832 | 687 | 5 | 225 | 3 |
| 710 | 783 | 759 | 804 | 31 | 815 | 753 | 95 | 622 | 827 | 611 | 7 | 152 | 834 | 614 | 836 |
| 140 | 112 | 42 | 766 | 811 | 791 | 761 | 202 | 128 | 816 | 227 | 831 | 144 | 806 | 615 | 820 |
| 699 | 727 | 797 | 73 | 28 | 48 | 78 | 637 | 711 | 23 | 612 | 8 | 695 | 33 | 224 | 19 |
| 719 | 148 | 40 | 693 | 30 | 771 | 796 | 649 | 697 | 34 | 132 | 823 | 134 | 788 | 618 | 817 |
| 120 | 691 | 799 | 146 | 809 | 68 | 43 | 190 | 142 | 805 | 707 | 16 | 705 | 51 | 221 | 22 |
| 629 | | | | 812 | 74 | 39 | 658 | 122 | 37 | 706 | 792 | 138 | 764 | 220 | 798 |
| 210 | | | | 27 | 765 | 800 | 181 | 717 | 802 | 133 | 47 | 701 | 75 | 619 | 41 |
| 168 | | | | 29 | 661 | 819 | 702 | 203 | 793 | 143 | 64 | 640 | 740 | 127 | 38 |
| 671 | | | | 810 | 178 | 20 | 137 | 636 | 46 | 696 | 775 | 199 | 99 | 712 | 801 |
| 84 | | | | | 703 | 818 | 125 | 721 | 207 | 704 | 57 | 162 | 743 | 147 | 44 |
| 755 | | | | | 136 | 21 | 714 | 118 | 632 | 135 | 782 | 677 | 96 | 692 | 795 |
| 105 | | | | | | | 151 | 729 | 660 | 161 | 735 | 176 | 97 | 124 | 52 |
| 734 | | | | | | | 688 | 110 | 179 | 678 | 104 | 663 | 742 | 715 | 787 |
| 746 | | | | | | | | 89 | 694 | 201 | 101 | 119 | 166 | 193 | 45 |
| 93 | | | | | | | | 750 | 145 | 638 | 738 | 720 | 673 | 646 | 794 |
| 70 | | | | | | | | 736 | 709 | 666 | 108 | 681 | 172 | 205 | 63 |
| 769 | | | | | | | | 103 | 130 | 173 | 731 | 158 | 667 | 634 | 776 |
| 779 | | | | | | | | 61 | 223 | 733 | 631 | 164 | 664 | 633 | 772 |
| 60 | | | | | | | | 778 | 616 | 106 | 208 | 675 | 175 | 206 | 67 |
| 2 | | | | | | | | 784 | | 756 | 655 | 665 | 652 | 723 | 72 |
| 837 | | | | | | | | 55 | | 83 | 184 | 174 | 187 | 116 | 767 |
| 1 | | | | | | | | 824 | | 748 | 197 | 668 | 676 | 679 | 76 |
| 838 | | | | | | | | 15 | | 91 | 642 | 171 | 163 | 160 | 763 |
| | | | | | | | | 825 | | 66 | 648 | 170 | 185 | 186 | 745 |
| | | | | | | | | 14 | | 773 | 191 | 669 | 654 | 653 | 94 |
| | | | | | | | | | | 53 | 718 | 87 | 639 | 167 | 737 |
| | | | | | | | | | | 786 | 121 | 752 | 200 | 672 | 102 |
| | | | | | | | | | | 10 | 141 | 670 | 114 | 760 | 90 |
| | | | | | | | | | | 829 | 698 | 169 | 725 | 79 | 749 |
| | | | | | | | | | | 9 | 149 | 751 | 189 | 754 | 109 |
| | | | | | | | | | | 830 | 690 | 88 | 650 | 85 | 730 |
| | | | | | | | | | | | 623 | 107 | 724 | 77 | 165 |
| | | | | | | | | | | | 216 | 732 | 115 | 762 | 674 |
| | | | | | | | | | | | 218 | 758 | 194 | 92 | 728 |
| | | | | | | | | | | | 621 | 81 | 645 | 747 | 111 |
| | | | | | | | | | | | | 82 | 195 | 781 | 209 |
| | | | | | | | | | | | | 757 | 644 | 58 | 630 |
| | | | | | | | | | | | | 100 | 647 | 62 | 204 |
| | | | | | | | | | | | | 739 | 192 | 777 | 635 |
| | | | | | | | | | | | | 98 | 182 | 69 | 117 |
| | | | | | | | | | | | | 741 | 657 | 770 | 722 |
| | | | | | | | | | | | | 768 | 682 | 54 | 651 |
| | | | | | | | | | | | | 71 | 157 | 785 | 188 |
| | | | | | | | | | | | | 59 | 156 | 803 | 680 |
| | | | | | | | | | | | | 780 | 683 | 36 | 159 |
| | | | | | | | | | | | | 65 | 211 | 807 | 198 |
| | | | | | | | | | | | | 774 | 628 | 32 | 641 |
| | | | | | | | | | | | | 789 | 154 | 25 | 113 |
| | | | | | | | | | | | | 50 | 685 | 814 | 726 |
| | | | | | | | | | | | | 49 | 716 | 821 | 656 |
| | | | | | | | | | | | | 790 | 123 | 18 | 183 |

TABLE 3-continued

Low CM group (Property a)

| SG 1 | SG 2 | SG 3 | SG 4 | SG 5 | SG 6 | SG 7 | SG 8 | SG 9 | SG 10 | SG 11 | SG 12 | SG 13 | SG 14 | SG 15 | SG 16 |
|---|---|---|---|---|---|---|---|---|---|---|---|---|---|---|---|
| | | | | | | | | | | | | 813 | 700 | 828 | 659 |
| | | | | | | | | | | | | 26 | 139 | 11 | 180 |
| | | | | | | | | | | | | 822 | 212 | 835 | 177 |
| | | | | | | | | | | | | 17 | 627 | 4 | 662 |
| | | | | | | | | | | | | 826 | 686 | | 643 |
| | | | | | | | | | | | | 13 | 153 | | 196 |
| | | | | | | | | | | | | 6 | 213 | | 155 |
| | | | | | | | | | | | | 833 | 626 | | 684 |
| | | | | | | | | | | | | | 215 | | 625 |
| | | | | | | | | | | | | | 624 | | 214 |
| | | | | | | | | | | | | | 689 | | 126 |
| | | | | | | | | | | | | | 150 | | 713 |
| | | | | | | | | | | | | | | | 708 |
| | | | | | | | | | | | | | | | 131 |
| | | | | | | | | | | | | | | | 219 |
| | | | | | | | | | | | | | | | 620 |
| | | | | | | | | | | | | | | | 617 |
| | | | | | | | | | | | | | | | 222 |
| | | | | | | | | | | | | | | | 613 |
| | | | | | | | | | | | | | | | 226 |

TABLE 4

High CM group (Property a)

| SG 1 | SG 2 | SG 3 | SG 4 | SG 5 | SG 6 | SG 7 | SG 8 | SG 9 | SG 10 | SG 11 | SG 12 | SG 13 | SG 14 | SG 15 | SG 16 |
|---|---|---|---|---|---|---|---|---|---|---|---|---|---|---|---|
| 609 | 323 | 237 | 509 | 257 | 346 | 608 | 546 | 242 | 317 | 603 | 484 | 604 | 530 | 367 | 503 |
| 230 | 516 | 602 | 330 | 582 | 493 | 231 | 293 | 597 | 522 | 236 | 355 | 235 | 309 | 472 | 336 |
| 232 | 320 | 600 | 338 | 566 | 500 | 260 | 288 | 274 | 307 | 303 | 434 | 572 | 265 | 296 | 534 |
| 607 | 519 | 239 | 501 | 273 | 339 | 579 | 551 | 565 | 532 | 536 | 405 | 267 | 574 | 543 | 305 |
| 577 | 334 | 244 | 498 | 584 | 351 | 268 | 284 | 402 | 553 | 356 | 435 | 302 | 233 | | 466 |
| 262 | 505 | 595 | 341 | 255 | 488 | 571 | 555 | 437 | 286 | 483 | 404 | 537 | 606 | | 373 |
| 587 | 359 | 243 | 499 | 254 | 306 | 563 | 471 | 383 | 552 | | 433 | | | | 280 |
| 252 | 480 | 596 | 340 | 585 | 533 | 276 | 368 | 456 | 287 | | 406 | | | | 559 |
| 418 | 544 | 275 | 497 | 245 | 550 | 430 | 253 | 482 | 573 | | | | | | 560 |
| 421 | 295 | 564 | 342 | 594 | 289 | 409 | 586 | 357 | 266 | | | | | | 279 |
| 416 | 454 | 561 | 301 | 588 | 439 | 398 | 583 | 510 | 578 | | | | | | 419 |
| 423 | 385 | 278 | 538 | 251 | 400 | 441 | 256 | 329 | 261 | | | | | | 420 |
| 426 | 292 | 589 | 366 | 412 | 461 | 549 | 263 | | | | | | | | 240 |
| 413 | 547 | 250 | 473 | 427 | 378 | 290 | 576 | | | | | | | | 599 |
| 428 | 291 | 246 | 401 | 467 | 465 | 535 | | | | | | | | | 258 |
| 411 | 548 | 593 | 438 | 372 | 374 | 304 | | | | | | | | | 581 |
| 463 | 381 | 417 | 468 | 557 | 415 | 308 | | | | | | | | | 610 |
| 376 | 458 | 422 | 371 | 282 | 424 | 531 | | | | | | | | | 229 |
| 444 | 399 | 248 | 408 | 436 | 569 | 358 | | | | | | | | | |
| 395 | 440 | 591 | 431 | 403 | 270 | 481 | | | | | | | | | |
| 283 | 380 | 445 | 464 | 396 | 598 | 316 | | | | | | | | | |
| 556 | 459 | 394 | 375 | 443 | 241 | 523 | | | | | | | | | |
| 285 | 442 | 393 | 249 | 447 | | | | | | | | | | | |
| 554 | 397 | 446 | 590 | 392 | | | | | | | | | | | |
| 379 | 470 | 370 | 269 | 448 | | | | | | | | | | | |
| 460 | 369 | 469 | 570 | 391 | | | | | | | | | | | |
| 449 | 462 | 365 | 238 | 457 | | | | | | | | | | | |
| 390 | 377 | 474 | 601 | 382 | | | | | | | | | | | |
| 363 | 429 | 300 | 605 | 389 | | | | | | | | | | | |
| 476 | 410 | 539 | 234 | 450 | | | | | | | | | | | |
| 455 | 407 | 299 | | 294 | | | | | | | | | | | |
| 384 | 432 | 540 | | 545 | | | | | | | | | | | |
| 451 | 281 | 475 | | 542 | | | | | | | | | | | |
| 388 | 558 | 364 | | 297 | | | | | | | | | | | |
| 386 | 425 | 362 | | 528 | | | | | | | | | | | |
| 453 | 414 | 477 | | 311 | | | | | | | | | | | |
| 478 | 592 | 541 | | 344 | | | | | | | | | | | |
| 361 | 247 | 298 | | 495 | | | | | | | | | | | |
| 452 | 562 | 527 | | 345 | | | | | | | | | | | |
| 387 | 277 | 312 | | 494 | | | | | | | | | | | |
| 360 | 568 | 313 | | 318 | | | | | | | | | | | |
| 479 | 271 | 526 | | 521 | | | | | | | | | | | |
| 529 | 272 | 525 | | 331 | | | | | | | | | | | |
| 310 | 567 | 314 | | 508 | | | | | | | | | | | |

TABLE 4-continued

High CM group (Property a)

| SG 1 | SG 2 | SG 3 | SG 4 | SG 5 | SG 6 | SG 7 | SG 8 | SG 9 | SG 10 | SG 11 | SG 12 | SG 13 | SG 14 | SG 15 | SG 16 |
|---|---|---|---|---|---|---|---|---|---|---|---|---|---|---|---|
| 485 | 264 | 353 | | 514 | | | | | | | | | | | |
| 354 | 575 | 486 | | 325 | | | | | | | | | | | |
| 511 | 580 | 487 | | 321 | | | | | | | | | | | |
| 328 | 259 | 352 | | 518 | | | | | | | | | | | |
| 524 | | 343 | | | | | | | | | | | | | |
| 315 | | 496 | | | | | | | | | | | | | |
| 337 | | 512 | | | | | | | | | | | | | |
| 502 | | 327 | | | | | | | | | | | | | |
| 349 | | 350 | | | | | | | | | | | | | |
| 490 | | 489 | | | | | | | | | | | | | |
| 504 | | 326 | | | | | | | | | | | | | |
| 335 | | 513 | | | | | | | | | | | | | |
| 515 | | 319 | | | | | | | | | | | | | |
| 324 | | 520 | | | | | | | | | | | | | |
| | | 332 | | | | | | | | | | | | | |
| | | 507 | | | | | | | | | | | | | |
| | | 506 | | | | | | | | | | | | | |
| | | 333 | | | | | | | | | | | | | |
| | | 491 | | | | | | | | | | | | | |
| | | 348 | | | | | | | | | | | | | |
| | | 492 | | | | | | | | | | | | | |
| | | 347 | | | | | | | | | | | | | |
| | | 517 | | | | | | | | | | | | | |
| | | 322 | | | | | | | | | | | | | |

The present invention further provides a method for sequencing the ZC sequences of the RACH.

Figure 5:
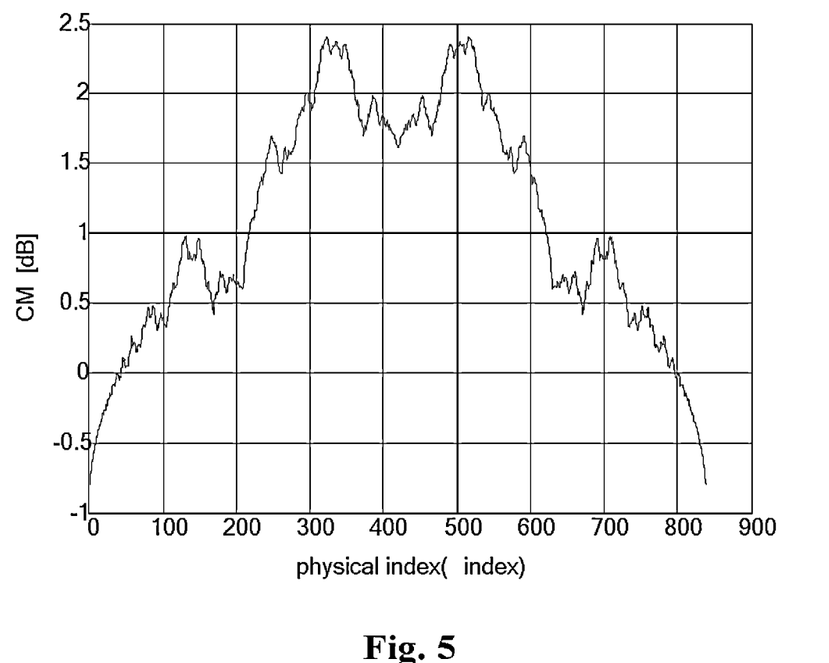
FIG. 5 is a schematic diagram showing the corresponding relation between the physical indices and the CM values of the ZC sequences according to an embodiment of the present invention.

For the ZC sequences generated according to Equation 3, the sequence with a physical index u and the sequence with a physical index N-u have the same CM value, as shown in FIG. 5, which is a schematic diagram showing the corresponding relation between the physical indices and the CM values of the ZC sequences according to an embodiment of the present invention. According to the method for sequencing the ZC sequences of the above embodiments, the sequencing is performed (from high to low or from low to high) according to the CM values of the sequences in each sub-group, thus in each sub-group, sequence u and N-u (u is the physical index of the sequence, and $0<=N-1$, N is the length of each ZC sequence) are exchangeable in order. At last, the mapping relationship between logical indices and physical indices shown in Table 5 can be obtained by combining Table 3 and Table 4.

TABLE 5

| group | Sub-group (logical indices) | Physical indices |
|---|---|---|
| low CM group | SG1 (0-23) | 129, 710, 140, 699, 120, 719, 210, 629, 168, 671, 84, 755, 105, 734, 93, 746, 70, 769, 60, 779, 2, 837, 1, 838 |
| | SG2 (24-29) | 56, 783, 112, 727, 148, 691 |
| | SG3 (30-35) | 80, 759, 42, 797, 40, 799 |
| | SG4 (36-41) | 35, 804, 73, 766, 146, 693 |
| | SG5 (42-51) | 31, 808, 28, 811, 30, 809, 27, 812, 29, 810 |
| | SG6 (52-63) | 24, 815, 48, 791, 68, 771, 74, 765, 178, 661, 136, 703 |
| | SG7 (64-75) | 86, 753, 78, 761, 43, 796, 39, 800, 20, 819, 21, 818 |
| | SG8 (76-89) | 95, 744, 202, 637, 190, 649, 181, 658, 137, 702, 125, 714, 151, 688 |
| | SG9 (90-115) | 217, 622, 128, 711, 142, 697, 122, 717, 203, 636, 118, 721, 110, 729, 89, 750, 103, 736, 61, 778, 55, 784, 15, 824, 14, 825 |
| | SG10 (116-135) | 12, 827, 23, 816, 34, 805, 37, 802, 46, 793, 207, 632, 179, 660, 145, 694, 130, 709, 223, 616 |
| | SG11 (136-167) | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| | SG12 (168-203) | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| | SG13 (204-263) | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| | SG14 (264-327) | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| | SG15 (328-383) | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |

TABLE 5-continued

| group | Sub-group (logical indices) | Physical indices |
|---|---|---|
| | SG16 (384-455) | 3, 836, 19, 820, 22, 817, 41, 798, 38, 801, 44, 795, 52, 787, 45, 794, 63, 776, 67, 772, 72 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| High CM group | SG1 (456-513) | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| | SG2 (514-561) | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| | SG3 (562-629) | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| | SG4 (630-659) | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| | SG5 (660-707) | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| | SG6 (708-729) | 346, 493, 339, 500, 351, 488, 306, 533, 289, 550, 400, 439, 378, 461, 374, 465, 415, 424, 270, 569, 241, 598 |
| | SG7 (730-751) | 231, 608, 260, 579, 268, 571, 276, 563, 409, 430, 398, 441, 290, 549, 304, 535, 308, 531, 358, 481, 316, 523 |
| | SG8 (752-765) | 293, 546, 288, 551, 284, 555, 368, 471, 253, 586, 256, 583, 263, 576 |
| | SG9 (766-777) | 242, 597, 274, 565, 402, 437, 383, 456, 357, 482, 329, 510 |
| | SG10 (778-789) | 317, 522, 307, 532, 286, 553, 287, 552, 266, 573, 261, 578 |
| | SG11 (790-795) | 236, 603, 303, 536, 356, 483 |
| | SG12 (796-803) | 355, 484, 405, 434, 404, 435, 406, 433 |
| | SG13 (804-809) | 235, 604, 267, 572, 302, 537 |
| | SG14 (810-815) | 309, 530, 265, 574, 233, 606 |
| | SG15 (816-819) | 367, 472, 296, 543 |
| | SG16 (820-837) | 336, 503, 305, 534, 373, 466, 280, 559, 279, 560, 419, 420, 240, 599, 258, 581, 229, 610 |

In a practical system, according to the random access system parameters (comprising the logical index of the first usable ZC sequence, cyclic shift, and high speed indication, etc.), a base station and a mobile terminal use the following method, to generate a random access preamble sequence of the current cell (the base station transmits the system parameters to the mobile terminal via broadcast channel).

1. the logical index x of the first usable ZC sequence is obtained;
2. the physical index of the ZC sequence is determined according to Table 5 and x;
3. a physical root sequence is generated using the determined physical index according to Equation 3;
4. the preamble sequence of the RACH is generated according to the cyclic shift Ncs and cyclic shift limitation rule;
5. if the total number of the current preamble sequences is less than an upper limit Q (Q=64), the logical index x of the usable ZC sequences is incremented, and steps 2-5 are repeated until the total number of the preamble sequences reaches to Q.

The present invention further provides a device for sequencing the ZC sequences of the RACH, which comprises: a first group dividing unit configured to divide the ZC sequences of the RACH into a low CM group and a high CM group according to the CM of QPSK, to make the index of each ZC sequence within the low CM group smaller or larger than the index of each ZC sequence within the high CM group; a second group dividing unit configured to respectively divide the ZC sequences within the low CM group and within the high CM group into S sub-groups using S−1 maximum cyclic shift thresholds according to the maximum cell radius or maximum cyclic shift supported by the ZC sequences under the high speed circumstance, wherein S is a positive integer; and a sequencing unit configured to sequence the sequences within each sub-group according to the CMs of the ZC sequences, to make the ZC sequences in adjacent sub-groups within the low CM group and within the high CM group have different sequencing, and the ZC sequences in adjacent sub-groups between the low CM group and the high CM group have the same sequencing, wherein the last sub-group within the low CM group and the first sub-group within the high CM group are adjacent with each other while the first sub-group within the low CM group and the last sub-group within the high CM group are adjacent with each other.

The present invention not only enables the assignment of the sequences according to the CMs, but also enables the collection of the sequence fragments for use, so that the generation of sequence fragments can be avoided. Meanwhile, the present invention is fully compatible to the first and the second re-sequencing methods described in the Background of the Invention, without introducing any extra signaling cost.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all included in the scope of the claims of the present invention.

What is claimed is:

1. A method for sequencing the Zadoff-Chu (ZC) sequences of the Random Access Channel (RACH), comprising:

step 1: a mobile terminal acquiring a logical index from logical indices of each ZC sequence via a Broadcast Channel, BCH, channel;

step 2: the mobile terminal creating mapping relationship between the logical indices and physical indices and acquiring a physical index corresponding to the logical index, wherein creating mapping relationship between the logical indices and physical indices comprising the following steps:

setting the logical index of each ZC sequence as α, and the physical index of each ZC sequence as u, wherein $1 \leq u \leq N-1, 0 \leq \alpha \leq N-2$, N is the length of each ZC sequence and N=839;

creating the physical indices u corresponding to the logical indices α=0, 1, . . . , 837, the physical indices u are:

129, 710, 140, 699, 120, 719, 210, 629, 168, 671, 84, 755, 105, 734, 93, 746, 70, 769, 60, 779, 2, 837, 1, 838, which correspond to logical indices 0-23 of a sub-group 1 of a low CM group;

56, 783, 112, 727, 148, 691, which correspond to logical indices 24-29 of a sub-group 2 of the low CM group;

80, 759, 42, 797, 40, 799, which correspond to logical indices 30-35 of a sub-group 3 of the low CM group;

35, 804, 73, 766, 146, 693, which correspond to logical indices 36-41 of a sub-group 4 of the low CM group;

31, 808, 28, 811, 30, 809, 27, 812, 29, 810, which correspond to logical indices 42-51 of a sub-group 5 of the low CM group;

24, 815, 48, 791, 68, 771, 74, 765, 178, 661, 136, 703, which correspond to logical indices 52-63 of a sub-group 6 of the low CM group;

86, 753, 78, 761, 43, 796, 39, 800, 20, 819, 21, 818, which correspond to logical indices 64-75 of a sub-group 7 of the low CM group;

95, 744, 202, 637, 190, 649, 181, 658, 137, 702, 125, 714, 151, 688, which correspond to logical indices 76-89 of a sub-group 8 of the low CM group;

217, 622, 128, 711, 142, 697, 122, 717, 203, 636, 118, 721, 110, 729, 89, 750, 103, 736, 61, 778, 55, 784, 15, 824, 14, 825, which correspond to logical indices 90-115 of a sub-group 9 of the low CM group;

12, 827, 23, 816, 34, 805, 37, 802, 46, 793, 207, 632, 179, 660, 145, 694, 130, 709, 223, 616, which correspond to logical indices 116-135 of a sub-group 10 of the low CM group;

228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830, which correspond to logical indices 136-167 of a sub-group 11 of the low CM group;

7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621, which correspond to logical indices 168-203 of a sub-group 12 of the low CM group;

152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833, which correspond to logical indices 204-263 of a sub-group 13 of the low CM group;

5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689, which correspond to logical indices 264-327 of a sub-group 14 of the low CM group;

225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835, which correspond to logical indices 328-383 of a sub-group 15 of the low CM group;

3, 836, 19, 820, 22, 817, 41, 798, 38, 801, 44, 795, 52, 787, 45, 794, 63, 776, 67, 772, 72, 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613, which correspond to logical indices 384-455 of a sub-group 16 of the low CM group;

230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515, which correspond to logical indices 456-513 of a sub-group 1 of a high CM group;

323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580, which correspond to logical indices 514-561 of a sub-group 2 of the high CM group;

237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517, which correspond to logical indices 562-629 of a sub-group 3 of the high CM group;

330, 509, 338, 501, 341, 498, 340, 499, 342, 497, 301, 538, 366, 473, 401, 438, 371, 468, 408, 431, 375, 464, 249, 590, 269, 570, 238, 601, 234, 605, which correspond to logical indices 630-659 of a sub-group 4 of the high CM group;

257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518, which correspond to logical indices 660-707 of a sub-group 5 of the high CM group;

346, 493, 339, 500, 351, 488, 306, 533, 289, 550, 400, 439, 378, 461, 374, 465, 415, 424, 270, 569, 241, 598, which correspond to logical indices 708-729 of a sub-group 6 of the high CM group;

231, 608, 260, 579, 268, 571, 276, 563, 409, 430, 398, 441, 290, 549, 304, 535, 308, 531, 358, 481, 316, 523, which correspond to logical indices 730-751 of a sub-group 7 of the high CM group;

293, 546, 288, 551, 284, 555, 368, 471, 253, 586, 256, 583, 263, 576, which correspond to logical indices 752-765 of a sub-group 8 of the high CM group;

242, 597, 274, 565, 402, 437, 383, 456, 357, 482, 329, 510, which correspond to logical indices 766-777 of a sub-group 9 of the high CM group;

317, 522, 307, 532, 286, 553, 287, 552, 266, 573, 261, 578, which correspond to logical indices 778-789 of a sub-group 10 of the high CM group;

236, 603, 303, 536, 356, 483, which correspond to logical indices 790-795 of a sub-group 11 of the high CM group;

355, 484, 405, 434, 404, 435, 406, 433, which correspond to logical indices 796-803 of a sub-group 12 of the high CM group;

235, 604, 267, 572, 302, 537, which correspond to logical indices 804-809 of a sub-group 13 of the high CM group;

309, 530, 265, 574, 233, 606, which correspond to logical indices 810-815 of a sub-group 14 of the high CM group;

367, 472, 296, 543, which correspond to logical indices 816-819 of a sub-group 15 of the high CM group;

336, 503, 305, 534, 373, 466, 280, 559, 279, 560, 419, 420, 240, 599, 258, 581, 229, 610, which correspond to logical indices 820-837 of a sub-group 16 of the high CM group;

wherein the ZC sequences of the RACH are divided into the high CM group and the low CM group according to a CM of QPSK, and sequences in each group are further divided into sub-groups according to maximum cyclic shift thresholds; and sequencing the ZC sequences of the RACH according to the created mapping relationship between the logical indices and the physical indices; and step 3: the mobile terminal determining a preamble according to the physical index.

\* \* \* \* \*